(12) United States Patent
Hensley et al.

(10) Patent No.: US 8,813,449 B1
(45) Date of Patent: *Aug. 26, 2014

(54) FIRE AND WATER RESISTANT EXPANSION AND SEISMIC JOINT SYSTEM

(71) Applicant: Emseal Joint Systems Ltd., Westborough, MA (US)

(72) Inventors: Lester Hensley, Westborough, MA (US); Bill Witherspoon, Guelph, CA (US)

(73) Assignee: Emseal Joint Systems Ltd., Westborough, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/723,605

(22) Filed: Dec. 21, 2012

Related U.S. Application Data

(63) Continuation of application No. 12/730,354, filed on Mar. 24, 2010, now Pat. No. 8,341,908.

(60) Provisional application No. 61/162,820, filed on Mar. 24, 2009.

(51) Int. Cl.
- *E04B 1/68* (2006.01)
- *E04B 1/94* (2006.01)
- *E04B 1/98* (2006.01)

(52) U.S. Cl.
CPC ... *E04B 1/94* (2013.01); *E04B 1/98* (2013.01); *E04B 1/68* (2013.01)
USPC ....... 52/396.01; 52/317; 52/396.03; 52/741.3

(58) Field of Classification Search
USPC ............... 52/232, 317, 393, 396.01, 396.03, 52/396.04, 396.07, 396.06, 586.1, 586.2; 404/47, 68
See application file for complete search history.

(56) References Cited

U.S. PATENT DOCUMENTS

| | | | |
|---|---|---|---|
| 3,355,846 A | 12/1967 | Tillson | |
| 3,372,521 A | 3/1968 | Thom | |
| 3,551,009 A | 12/1970 | Cammuso et al. | |
| 3,670,470 A | 6/1972 | Thom | |

(Continued)

FOREIGN PATENT DOCUMENTS

| | | |
|---|---|---|
| CA | 1259351 | 9/1989 |
| CA | 2640007 A1 | 3/2009 |

(Continued)

OTHER PUBLICATIONS

Emseal Joint Systems Ltd., SJS-100-CHT-RN In Recess w/ Header Material. Nov. 20, 2007.*

(Continued)

*Primary Examiner* — William Gilbert
(74) *Attorney, Agent, or Firm* — MKG, LLC

(57) ABSTRACT

A fire and water resistant expansion joint system has a cover plate; a spline attached to the cover plate along a first edge of the spline; and two portions of foam, each portion being located on an opposing face of the spline. The foam has a fire-retardant material infused therein. The spline depends from the cover plate and is positioned in a gap between substantially coplanar substrates such that the cover plate overlies the gap. Each portion of the foam is compressed between a respective face of the spline and a face of one of the coplanar substrates.

17 Claims, 5 Drawing Sheets

(56) References Cited

U.S. PATENT DOCUMENTS

| | | | |
|---|---|---|---|
| 3,672,707 A | 6/1972 | Russo et al. | |
| 3,677,145 A | 7/1972 | Wattiez | |
| 3,934,905 A | 1/1976 | Lockard | |
| 3,956,557 A | 5/1976 | Hurst | |
| 4,058,947 A | 11/1977 | Earle et al. | |
| 4,362,428 A | 12/1982 | Kerschner | |
| 4,401,716 A | 8/1983 | Tschudin-Mahrer | |
| 4,455,396 A * | 6/1984 | Al-Tabaqchall et al. | 521/54 |
| 4,566,242 A | 1/1986 | Dunsworth | |
| 4,637,085 A | 1/1987 | Hartkorn | |
| 4,773,791 A | 9/1988 | Hartkorn | |
| 4,781,003 A | 11/1988 | Rizza | |
| 4,916,878 A | 4/1990 | Nicholas | |
| 4,942,710 A | 7/1990 | Rumsey | |
| 4,957,798 A | 9/1990 | Bogdany | |
| 5,094,057 A | 3/1992 | Morris | |
| 5,115,603 A | 5/1992 | Blair | |
| 5,130,176 A * | 7/1992 | Baerveldt | 428/192 |
| 5,213,441 A | 5/1993 | Baerveldt | |
| 5,249,404 A | 10/1993 | Leek et al. | |
| 5,327,693 A | 7/1994 | Schmid | |
| 5,335,466 A | 8/1994 | Langohr | |
| 5,338,130 A | 8/1994 | Baerveldt | |
| 5,365,713 A | 11/1994 | Nicholas et al. | |
| 5,450,806 A | 9/1995 | Jean | |
| 5,508,321 A | 4/1996 | Brebner | |
| 5,572,920 A | 11/1996 | Kennedy et al. | |
| 5,628,857 A | 5/1997 | Baerveldt | |
| 5,887,400 A | 3/1999 | Bratek et al. | |
| 5,935,695 A | 8/1999 | Baerveldt | |
| 6,014,848 A | 1/2000 | Hilburn, Jr. | |
| 6,128,874 A | 10/2000 | Olson et al. | |
| 6,460,214 B1 | 10/2002 | Chang | |
| 6,491,468 B1 | 12/2002 | Hagen | |
| 6,499,265 B2 | 12/2002 | Shreiner | |
| 6,532,708 B1 | 3/2003 | Baerveldt | |
| 6,685,196 B1 | 2/2004 | Baerveldt | |
| 6,860,074 B2 | 3/2005 | Stanchfield | |
| 6,948,287 B2 | 9/2005 | Korn | |
| 7,114,899 B2 | 10/2006 | Gass et al. | |
| 7,240,905 B1 | 7/2007 | Stahl, Sr. | |
| 7,748,310 B2 | 7/2010 | Kennedy | |
| 7,941,981 B2 | 5/2011 | Shaw | |
| 8,171,590 B2 | 5/2012 | Kim | |
| 8,317,444 B1 | 11/2012 | Hensley | |
| 8,365,495 B1 | 2/2013 | Witherspoon | |
| 2002/0193552 A1 | 12/2002 | Kiuchi et al. | |
| 2003/0110723 A1 | 6/2003 | Baerveldt | |
| 2006/0030227 A1 | 2/2006 | Hairston et al. | |
| 2008/0193738 A1 | 8/2008 | Hensley et al. | |
| 2010/0275539 A1 | 11/2010 | Shaw | |
| 2010/0319287 A1 | 12/2010 | Shaw | |
| 2012/0117900 A1 | 5/2012 | Shaw | |

FOREIGN PATENT DOCUMENTS

| | | |
|---|---|---|
| DE | 19809973 C1 | 7/1999 |
| DE | 102005054375 A1 | 5/2007 |
| EP | 1118715 A1 | 7/2001 |
| GB | 2377379 A | 1/2003 |
| WO | 2007024246 A1 | 3/2007 |

OTHER PUBLICATIONS

"Polyurethane Foam Field Joint Infill Systems", Sep. 23, 2007 (via Snagit), PIH, pp. 1-4.

Stein, Daryl et al. "Chlorinated Paraffins as Effective Low Cost Flame Retardants for Polyethylene" Dover Chemical Corporation.

EMSEAL Joint Systems Ltd. Drawing Part No. 010-0-00-00 dated Dec. 6, 2005.

EMSEAL Material Safety Data Sheet dated Apr. 2002, pp. 1-2.

EMSEAL "Benchmarks of Performance for High-Movement Acrylic-Impregnated, Precompressed, Foam Sealants When Considering Substitutions"; http://www.emseal.com/Knowledge/AcrylicVsWax/AcrylicVsWaxBased.htm; printed on Jul. 3, 2012, pp. 1-4.

EMSEAL Colorseal & Seismic Colorseal Install Data, May 1997, pp. 1-2.

EMSEAL Colorseal Tech Data, Jan. 2000, pp. 1-2.

EMSEAL "Is There a Gap in Your Air Barrier Wall Design?: Overlooking joint sealing where it really matters—in the structural backup wall"; http://www.emseal.com/Knowledge/GapInAirBarrierDesign/GapInAirBarrierDesign.htm; printed on Jul. 19, 2012, pp. 1-2.

Manfredi, Liliana; et al. "Thermal degradation and fire resistance of unsaturated polyester, modified acrylic resins and their composites with natural fibres" Polymer Degradation and Stability 91; 2006; pp. 255-261.

EMSEAL "Pre-cured-Caulk-And-Backerblock" Not New, Not Equal to EMSEAL's COLORSEAL; http://www.emseal.com/Knowledge/PreCuredCaulk/COLORSEALvsPreCuredCaulk.htm; printed on Jul. 19, 2012, pp. 1-3.

EMSEAL, Joint Systems, Techdata, Jun. 1997.

"UL Standard for Safety for Tests for Fire Resistance of Building Joint Systems, UL 2079" Underwriters Laboratories Inc. (UL); Fourth Edition; dated Oct. 21, 2004.

* cited by examiner

FIRE AND WATER RESISTANT EXPANSION AND SEISMIC JOINT SYSTEM

CROSS REFERENCE TO RELATED APPLICATION

This application is a Continuation Application of U.S. patent application Ser. No. 12/730,354, filed on Mar. 24, 2010, now U.S. Pat. No. 8,341,908, which claims the benefit of U.S. Provisional Patent Application No. 61/162,820, filed on Mar. 24, 2009, the contents of each of which are incorporated herein by reference in their entireties and the benefits of each are fully claimed herein.

TECHNICAL FIELD

The present invention relates generally to joint systems and, more particularly, to an expansion and seismic joint system that is fire and water resistant for use in building and construction applications.

BACKGROUND

Building and construction applications in which materials such as concrete, metal, and glass are used typically employ joint systems that accommodate thermal expansion and/or seismic movement of the various materials thereof. These joint systems may be positioned to extend through both the interior and exterior surfaces (e.g., walls, floors, and roofs) of a building or other structure. In the case of an exterior joint in an exterior wall, roof, or floor exposed to external environmental conditions, the joint system may also, to some degree, resist the effects of such conditions. As such, most exterior joints are designed to resist the effects of water. In particular, vertically-oriented exterior joints are designed to resist water in the form of rain, snow, ice, or debris that is driven by wind. Horizontally-oriented joints are designed to resist water in the form of rain, standing water, snow, ice, debris such as sand, and in some circumstances several of these at the same time. Additionally, some horizontal systems may be subjected to pedestrian and/or vehicular traffic and are designed to withstand such traffic.

In the case of interior joints, water tightness aspects are less of an issue than they are in exterior joints, and so products are often designed simply to accommodate building movement. However, interior horizontal joints may also be subject to pedestrian traffic and in some cases vehicular traffic as well. Particularly with regard to joints in horizontal surfaces, cover plates can be fitted over the joints to allow for the smooth movement of traffic over the joint and/or to protect the material of the joint from the effects of the weather.

It has been generally recognized that building joint systems are deficient with respect to fire resistance. In some instances, movement as a result of building joint systems has been shown to create chimney effects which can have consequences with regard to fire containment. This often results in the subversion of fire resistive elements that may be incorporated into the construction of a building. This problem is particularly severe in large high-rise buildings, parking garages, and stadiums where fire may spread too rapidly to allow the structures to be evacuated.

Early designs for fire resistive joints included blocks of mineral wool or other inorganic materials of either monolithic or composite constructions. Field-applied liquid sealants were often used in these joints. In general, these designs were adequate for non-moving joints or control joints where movements were very small. Where movements were larger and the materials were significantly compressed during the normal thermal expansion cycles of the building structure, these designs generally did not function as intended. Indeed, many designs simply lacked the resilience or recovery characteristics for maintaining adequate coverage of the entire joint width throughout the normal thermal cycle (expansion and contraction) that buildings experience. Many of these designs were tested in accordance with accepted standards such as ASTM E-119, which provides for fire exposure testing of building components under static conditions and does not take into account the dynamic nature of expansion joint systems. As described above, this dynamic behavior can contribute to the compromise of the fire resistance properties of some building designs.

Underwriters Laboratories developed UL 2079, a further refinement of ASTM E-119, by adding a cycling regimen to the test. Additionally, UL 2079 stipulates that the design be tested at the maximum joint size. This test is more reflective of real world conditions, and as such, architects and engineers have begun requesting expansion joint products that meet it. Many designs which pass ASTM E-119 without the cycling regime do not pass UL 2079. This may be adequate, as stated above, for non-moving building joints; however, most building expansion joint systems are designed to accommodate some movement as a result of thermal effects (e.g., expansion into the joint and contraction away from the joint) or as a result of seismic movement.

Both expansion joints and fire resistive expansion joints typically address either the water tightness (waterproof or water resistance) aspects of the expansion joint system or the fire resistive nature of the expansion joint system, as described above, but not both.

Water tight expansion joints exist in many forms, but in general they are constructed from materials designed to resist water penetration during the mechanical cycling caused by movement of the building due to thermal effects. These designs generally do not have fire resistant properties in a sufficient fashion to meet even the lowest fire rating standards. Indeed, many waterproofing materials act as fuel for any fire present, which can lead to a chimney effect that rapidly spreads fire throughout a building.

Conversely, many fire rated expansion joints are not sufficiently water tight to render them suitable for exterior applications. Many designs reliant upon mineral wool, ceramic materials and blankets, and intumescents, alone or in combination with each other, have compromised fire resistance by coming into contact with water. Additionally, as noted above, many fire rated designs cannot accommodate the mechanical cycling due to thermal effects without compromising the fire resistance.

This has resulted in the installation of two systems for each expansion joint where both a fire rating and water resistance is desired. In many cases, there simply is not sufficient room in the physical space occupied by the expansion joint to accommodate both a fire rated system and a system capable of providing waterproofing or water resistance. In instances where the physical accommodation can be made, the resultant installation involves two products, with each product involving its own crew of trained installers. Care is exercised such that one installation does not compromise the other.

Many systems also employ on-site assembly to create a finished expansion joint system. This is arguably another weakness, as an incorrectly installed or constructed system may compromise fire and water resistance properties. In some cases, these fire resistant expansion joint systems do not employ cover plates and are instead invasively anchored to the concrete substrate. Over time, the points at which such systems are anchored are subject to cracking and ultimately spalling, which may subvert the effectiveness of the fire resistance by simply allowing the fire to go around the fire resistant elements of the system. Without cover plates over the joints, fire in these cases would not be contained within the joints.

Also, many expansion joint products do not fully consider the irregular nature of building expansion joints. It is quite common for an expansion joint to have several transition areas along its length. These may be walls, parapets, columns or other obstructions. As such, the expansion joint product, in some fashion or other, follows the joint. In many products, this is a point of weakness, as the homogeneous nature of the product is interrupted. Methods of handling these transitions include stitching, gluing, and welding. All of these are weak spots from both a water proofing aspect and a fire resistance aspect.

SUMMARY OF THE INVENTION

As used herein, the term "waterproof" means that the flow of water is prevented, the term "water resistant" means that the flow of water is inhibited, and the term "fire resistant" means that the spread of fire is inhibited.

In one aspect, the present invention resides in an expansion joint system having a cover plate; a spline attached to the cover plate along a first edge of the spline; and two portions of open celled foam, each portion being located on an opposing face of the spline. The open celled foam has a fire-retardant material infused therein and layers of waterproof elastomer disposed thereon. The spline depends from the cover plate and is positioned in a gap between substantially coplanar substrates such that the cover plate covers the gap. Each portion of the open celled foam is compressed between a respective face of the spline and a face of one of the coplanar substrates. An intumescent material may be incorporated into the spline.

In another aspect, the present invention resides in an expansion joint system having a cover plate; a spline attached to the cover plate, the spline having an I-shaped cross section and comprising a vertical element, a first horizontally-oriented flange located at one end of the vertical element, and a second horizontally-oriented flange located at an opposing end of the vertical element; and open celled foam located on each side of the vertical element of the spline. The open celled foam has a fire-retardant material infused therein and layers of waterproof elastomer disposed thereon. The spline depends from the cover plate and is positioned in a gap between substantially coplanar substrates such that the cover plate covers the gap. Each portion of the open celled foam is compressed between a respective side of the vertical element of the spline and a face of one of the coplanar substrates.

In another aspect, the present invention resides in an expansion joint system having a cover plate; a spline attached to the cover plate, the spline comprising two vertical elements each having a horizontally-oriented flange, the vertical elements being arranged back-to-back, and the horizontally-oriented flanges being attached to the cover plate; and open celled foam located on each side of the spline. The open celled foam has a fire-retardant material infused therein and layers of waterproof elastomer disposed thereon. The spline depends from the cover plate and is positioned in a gap between substantially coplanar substrates such that the cover plate covers the gap. Each portion of the open celled foam is compressed between a respective side of the spline and a face of one of the coplanar substrates.

In the foregoing expansion joint systems, the elastomer material is cured and provides for water tightness (waterproofing and/or water resistance), the intumescent material (if present) is cured to provide for fire resistance, and the fire retardant infused open celled foam provides for both fire resistance and movement properties. These materials can be assembled and arranged so as to offer water tightness in one direction and fire resistance in the other (an asymmetrical configuration), or in a fashion that offers both water tightness and fire resistance in both directions (a symmetrical configuration) through a building joint. The system is delivered to the job site in a pre-compressed state ready for installation into the joint.

DETAILED DESCRIPTION OF THE INVENTION

The expansion joint systems described herein can be understood by referring to the attached drawings and also to U.S. Pat. No. 6,532,708, which is incorporated by reference herein. One embodiment of an expansion joint system as described herein is installed between concrete substrates to define a concrete expansion joint system capable of accommodating movement of the concrete substrates due to thermal effects and/or seismic effects. The present invention is not limited in this regard, however, as the expansion joint system may be installed between substrates or surfaces other than concrete. Materials for such substrates or surfaces include, but are not limited to, glass, asphalt, stone (granite, marble, etc.), and the like. Furthermore, the expansion joint systems described herein are generally referred to as being horizontally oriented; however, the present invention is not limited in this regard, as the joint systems (with or without cover plates) can also be installed vertically.

Figure 1:
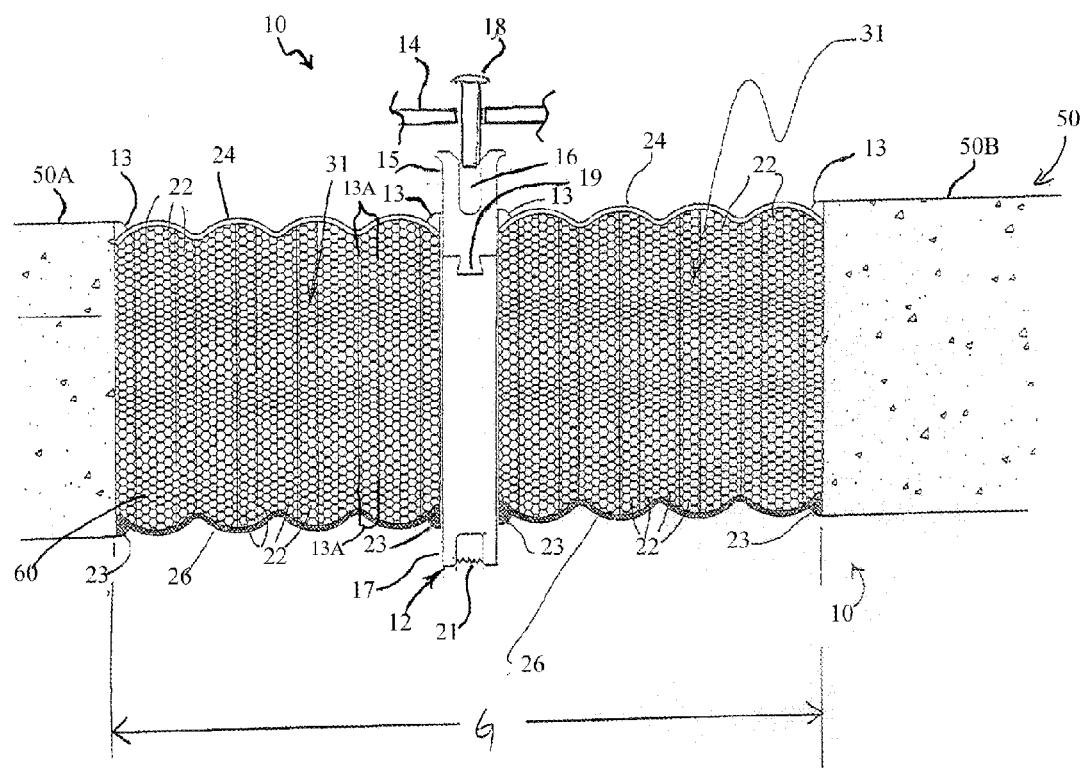
FIG. 1 is a schematic view of one embodiment of an expansion joint system of the present invention.

Referring to FIG. 1, one embodiment of an expansion joint system is shown at 10 and is hereinafter referred to as "system 10." In system 10, a spline 12 is located between horizontally-oriented concrete substrates 50, two substrates 50A and 50B being shown. The spline 12 can be positioned between concrete substrates 50 via the use of a cover plate 14 that is located over and spans a gap G between the concrete substrates 50 such that the spline extends substantially vertically into the gap G. Fasteners 18 are used secure the cover plate 14 to the spline 12.

The spline 12 can comprise one or more pieces. In a one-piece or "monolithic" configuration, the spline 12 comprises a suitable material such as graphite or a plastic (e.g., polycarbonate, acrylic, polyvinyl chloride, or the like) or any other material. While in some instances it is preferable that the spline material is non-electrically conductive, the present invention is not limited in this regard, as a monolithic spline 12 could be metal or an alloy of two or more metals.

In a two-piece or multi-piece configuration, the spline 12 may comprise different materials that are suitable for the application at hand. For example, in an application where increased rigidity is desired, the spline 12 may be comprised of a first piece fabricated or formed from a metal and joined edge-to-edge with a second piece fabricated or formed from the non-conductive material. Metals that may be used for the spline 12 include, but are not limited to, aluminum, steel (e.g., stainless steel), and the like.

In one embodiment of a two-piece spline 12, an upper portion 15 includes holes 16, channels, or similar structure to receive the fasteners 18. The upper portion 15 is an aluminum bar or rail having holes 16 located in an upper end in which the fasteners 18 are received. A lower end of the upper portion 15 includes a protrusion 19 that enables the upper portion to connect to a corresponding slot or the like in a lower portion 17 of the spline 12 in a dovetail-type fitting. The present invention is not limited in this regard, as the upper portion 15 can be connected to the lower portion 17 using any suitable means. The lower portion 17 is preferably fabricated of the non-conductive plastic or similar material. A channel is located in a bottom end of the lower portion, and an intumescent material 21 is located therein. The spline 12 is not limited to the use of metal upper portions 15 and non-conductive lower portions 17, as other materials are within the scope of the present invention.

Whether the spline 12 is monolithic or constructed of multiple pieces, laminations of open celled polyurethane foam 22 (hereinafter referred to as "foam 22") are arranged to form laminates 31, which are located on both sides of the spline 12 and are compressed in the gap G between the concrete substrates 50. The present invention is not limited to the use of polyurethane foams, as other foams are within the scope of the present invention. The individual laminations 13A are layers that extend parallel and in the direction in which the joint extends and along the length thereof and are constructed by infusing each lamination with an amount of fire retardant material 60. However, the structures of the present invention are also not limited in this regard, as the foam may comprise a block of foam of fixed size depending upon the desired joint size, a laminate comprising laminations oriented perpendicular to the direction in which the joint extends, or combinations of the foregoing.

Because the amounts of foam 22 that are located on either side of the spline 12 are substantially equal and subject to substantially the same environmental conditions, the force of the compressed foam as it expands on one side of the spline 12 is substantially equal to the force of the compressed foam exerted on the other side of the spline. Thus, once installed, the system 10 is generally in equilibrium, and the spline 12 is self-centering within the gap between the concrete substrates 50. The cover plate 14, which overlies the gap between the substrates 50 and generally completely covers the gap, is preferably centered with respect to the spline 12.

Each lamination of the foam 22 may be infused with a water-based aluminum tri-hydrate fire retardant material 60 to form the defined expansion joint. The amount of fire retardant material 60 is between 3.5:1 and 4:1 in ratio with the un-infused foam itself. The resultant uncompressed laminate has a density of approximately 140 kg/m$^3$.

In the system 10, several laminations, the number depending on the desired size of the expansion joint, are compiled and then compressed. The spline 12 is placed on an end surface of the compiled laminations, and several additional laminations are compiled and placed on the spline and compressed. The entire foam/spline/foam assembly is held at compression in a suitable fixture. The fixture is at a width slightly greater than that which the expansion joint is anticipated to experience at the largest possible movement of the adjacent concrete surfaces. At this width, the infused foam laminate is coated with a waterproof elastomer 24 at one surface (e.g., on the top side). This waterproof elastomer may be a polysulfide, silicone, acrylic, polyurethane, poly-epoxide, silyl-terminated polyether, a formulation of one or more of the foregoing materials with or without other elastomeric components or similar suitable elastomeric coating or liquid sealant materials, or a mixture, blend, or other formulation of one or more of the foregoing. One preferred elastomer coating for application to a horizontal deck where vehicular traffic is expected is Pecora 301, which is a silicone pavement sealant available from Pecora Corporation of Harleysville, Pa. Another preferred elastomeric coating is Dow Corning 888, which is a silicone joint sealant available from Dow Corning Corporation of Midland, Mich. Both of the foregoing elastomers are traffic grade rated sealants. For vertically-oriented expansion joints, exemplary preferred elastomer coatings include Pecora 890, Dow Corning 790, and Dow Corning 795.

Depending on the nature of the adhesive characteristics of the elastomer 24, a primer may be applied to the outer surfaces of the laminations of foam 22 prior to the coating with the elastomer. Applying such a primer may facilitate the adhesion of the elastomer 24 to the foam 22.

The elastomer 24 is tooled to create a "bellows" profile (or a similar profile) such that the elastomeric material can be compressed in a uniform and aesthetic fashion while being maintained in a virtually tensionless environment.

The surface of the laminate 31 opposite the surface coated with the waterproofing elastomer 24 (the bottom side) is coated with an intumescent material 26. One preferred intumescent material 26 is 3M CP25WB+, which is a fire barrier caulk. Both the coating of the elastomer 24 and the intumescent material 26 are cured in place on the foam 22 while the infused foam lamination is held at the prescribed compressed width. After the elastomer 24 and the intumescent material 26 have been cured, the entire foam composite and spline assembly is removed from the fixture, optionally compressed to less than the nominal size of the material, and packaged for shipment to the job site. This first embodiment is suited to horizontal parking deck applications where waterproofing is desired on the top side and fire resistance is desired from beneath.

In this system 10, a sealant band and/or corner bead 13 of the elastomer 24 can be applied on the side(s) of the interface between the foam laminate and the concrete substrate 50 to create a water tight seal. On the opposite side, a sealant band and/or corner bead 23 of the intumescent material 16 can be similarly applied to create a homogeneous intumescent face on the fire resistant side.

Figure 2:
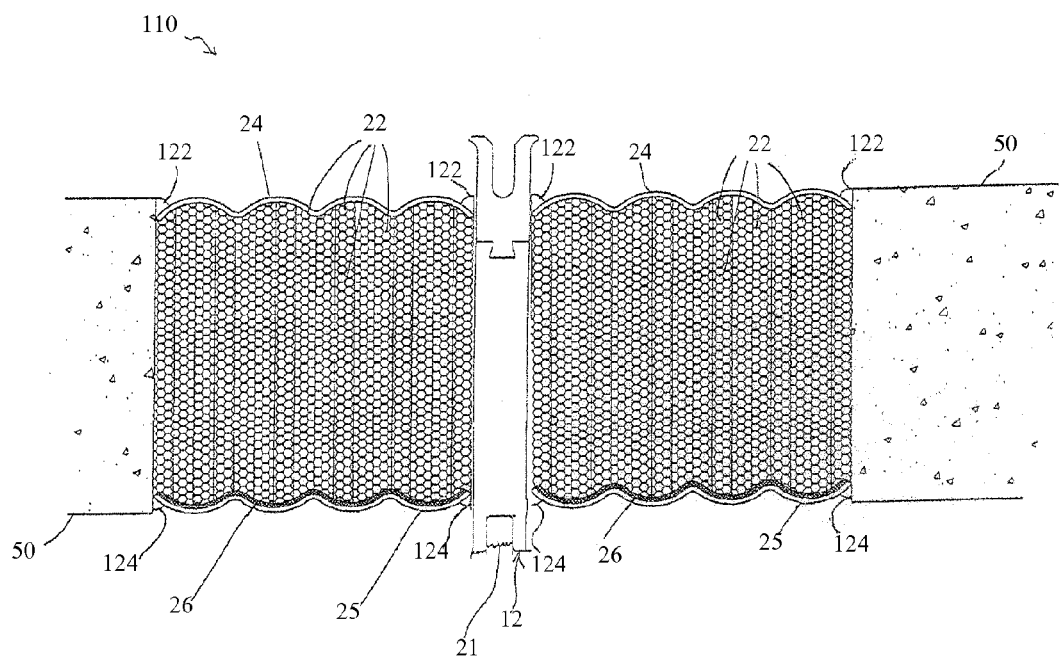
FIG. 2 is a schematic view of another embodiment of an expansion joint system of the present invention.

Referring now to FIG. 2, an alternate expansion joint system 110 of the present invention includes two portions of foam 22 disposed on either side of the spline 12. The spline 12 may be monolithic or constructed of multiple pieces. The foam 22 has a first elastomer 24 coated on one surface (e.g., the top side) and the intumescent material 26 coated on an opposing surface (e.g., the bottom side). A second elastomer 25 is coated on the intumescent material 26 and provides a waterproofing function. In this manner, the system 110 is water resistant in both directions and fire resistant in one direction. The system 110 is used in applications that are similar to the applications in which the system 10 is used, but may be used where water is present on the underside of the expansion joint. Additionally, system 10 would be suitable for vertical expansion joints where waterproofing or water resistance is desirable in both directions while fire resistance is desired in only one direction. The second elastomer 25 may also serve to aesthetically integrate the system 110 with surrounding substrate material.

Sealant bands and/or corner beads 122 of the first elastomer 24 can be applied to the sides as with the embodiment described above. On the opposite side, a band or bead of the intumescent material 26 can be applied between the concrete substrate 50 and the foam lamination with any excess being removed. Sealant bands and/or corner beads 124 can be applied on top of the second elastomer 25, thereby creating a water tight seal between the concrete substrate 50 and the intumescent material.

Figure 3:
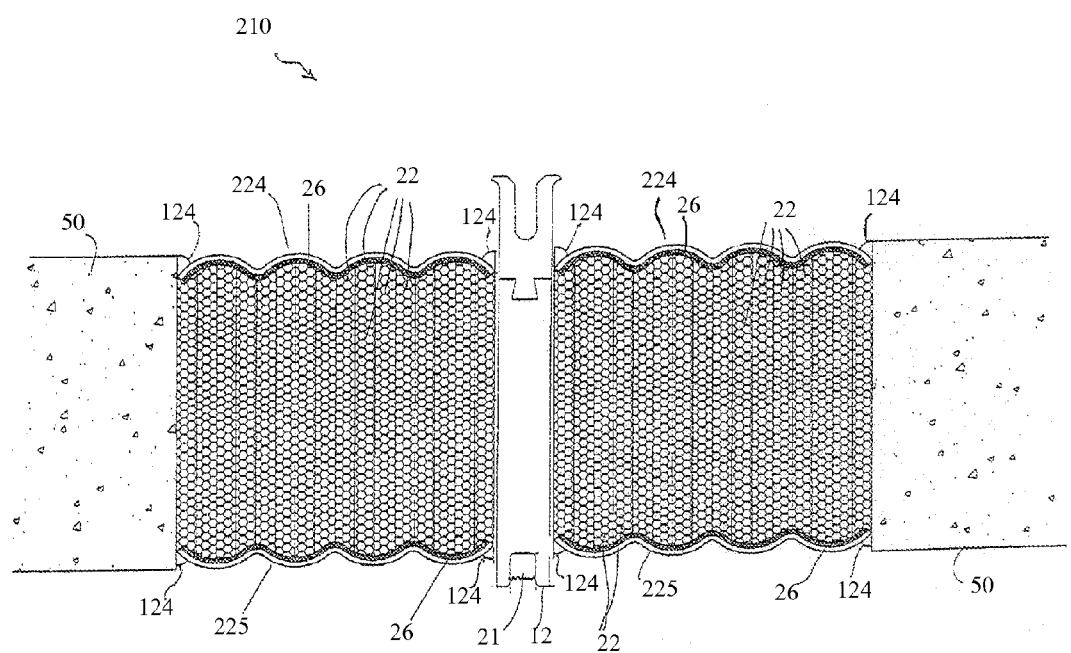
FIG. 3 is a schematic view of another embodiment of an expansion joint system of the present invention.

Referring now to FIG. 3, another expansion joint system of the present invention is shown at 210. In system 210, the foam 22 is located on either side of the spline 12, which may be monolithic or constructed of multiple pieces. The foam 22 is similar to or the same as the above-described foam, but both exposed surfaces (the top and bottom sides) are coated first with the intumescent material 26 to define a first coating of the intumescent material on the top side and a second coating of the intumescent material 26 on the bottom side. The first coating of the intumescent material 26 is coated with a first elastomer material 224, and the second coating of the intumescent material 26 is coated with a second elastomer material 225. This system 210 can be used in the same environments as the above-described systems with the added benefit that it is both waterproof or at least water resistant and fire resistant in both directions through the joint. This makes it especially suitable for vertical joints in either interior or exterior applications.

In system 210, sealant bands and/or corner beads of the intumescent material and sealant bands and/or corner beads 124 of the elastomer are applied in a similar fashion as described above and on both sides of the foam 22. This creates homogeneous intumescent layers and a water tight elastomer layer above them on both sides of the foam 22 (on the top side and the bottom side).

Figure 4:
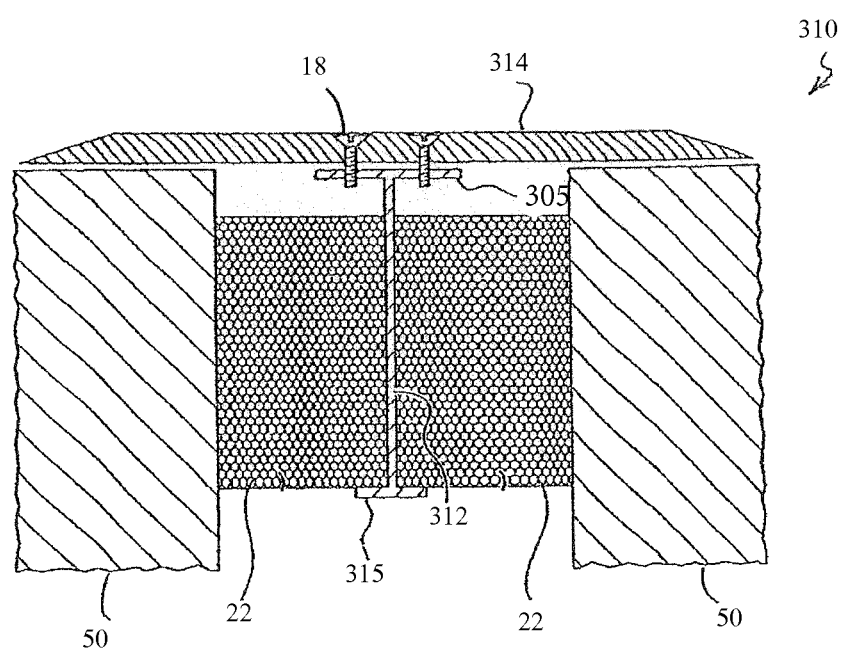
FIG. 4 is a schematic view of another embodiment of an expansion joint system of the present invention.

Referring now to FIG. 4, another embodiment of the expansion joint system is shown at 310 and is hereinafter referred to as "system 310." System 310 includes a spline 312 (similar to spline 5 of the aforementioned U.S. Pat. No. 6,532,708 (FIG. 4)), which is a monolithic element having an I-shaped cross section defined by a vertical member and two horizontally oriented flanges located at either end thereof. Spline 312 provides for both the cover plate anchor and the self-centering mechanism. The present invention is not limited in this regard, however, as the spline 312 may be constructed of multiple pieces. Flanges 305 on the upper end of the spline 312 enable the cover plate 314 to be located on the spline and secured thereto using any suitable fastener 18 (e.g., a screw). The vertical leg of the spline 312 extends into the gap between the concrete substrates 50, and the length thereof depends upon the joint dimensions and the size of the foam 22 located on either side of the spline 312. The foam 22 can be defined by any configuration of waterproofing elastomer, intumescent material, and beads as described above. Flanges 315 located on the bottom end of the spline 312 support the foam 22 and facilitate the retaining of the foam in the gap.

Figure 5:
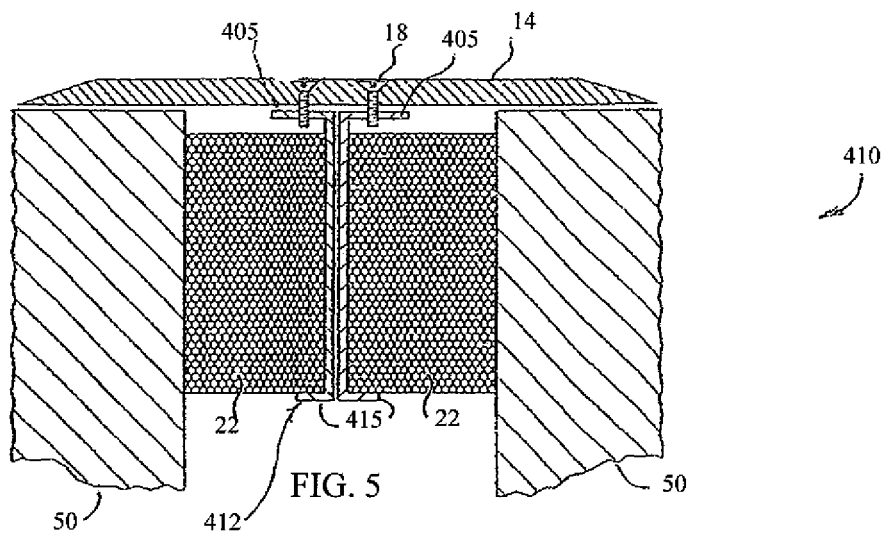
FIG. 5 is a schematic view of another embodiment of an expansion joint system of the present invention.

Referring now to FIG. 5, another embodiment of the expansion joint system is shown at 410 and is hereinafter referred to as "system 410." System 410 compensates for irregularities in joint construction with regard to both horizontal and vertical joint parameters. In other words, the opposing sides of a joint may not be parallel or equidistant from each other. In such a case, the expansion of the foam 22 incorporated into the joint on one side of the spline 412 may not reflect the same expansion characteristics of the foam on the other side of the spline due to irregularities in width of the gap and/or vertical/horizontal alignment of concrete substrates 50.

In system 410, the spline 412 (which is similar to spline of the aforementioned U.S. Pat. No. 6,532,708 (FIG. 5)) comprises two vertical elements positioned back-to-back, each including a top flange 405 and a bottom flange 415. The top flanges 405 are each connected to the cover plate 14 via fasteners 18. The bottom flanges 415 facilitate the support of the foam 22 against the respective vertical element of the spline 412 and the concrete substrate 50. Each top flange 405 can be individually tensioned to the cover plate 14 to allow the portions of foam 22 on either side of the spline 412 to be adjusted independently so as to enable the foam to rest in the joint in the desired manner. Again, the foam 22 can be defined by any configuration of waterproofing elastomer, intumescent material, and beads as described above.

Figure 6:
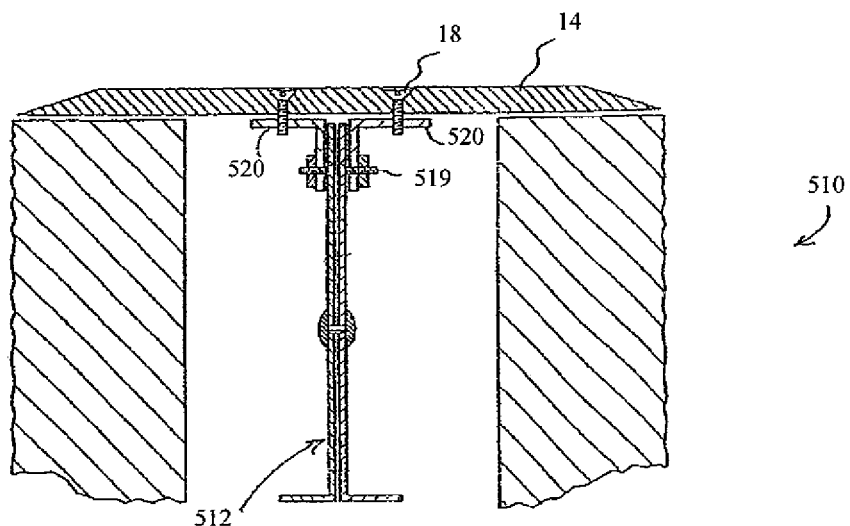
FIG. 6 is a schematic view of another embodiment of an expansion joint system of the present invention.

A system 510 as shown in FIG. 6 comprises a means to adjust the final position of the cover plate 14 relative to vertical elements of a spline 512 (which is similar to spline of aforementioned U.S. Pat. No. 6,532,708 (FIG. 6)). The means to adjust the cover plate 14 is below the cover plate and comprises a bolt 519 or similar mechanism that extends laterally through both vertical elements of the spline 512 and also through vertical portions of angulated flanges 520 attached to upper ends of the spline. Horizontal portions of the angulated flanges 520 are in turn attached to the cover plate 14 using fasteners 18. The angulated portions 520 are adjustable relative to the vertical portions of the spline 512 by means of vertically-extending slots in the vertical portions and/or the angulated portions themselves, through which the bolt 519 extends, thus allowing each angulated portion to be adjusted and secured to accommodate the foam 22 and the cover plate 14 to suitably retain the foam 22. The foam 22 is not shown in system 510, but it can be defined by any configuration of waterproofing elastomer, intumescent material, and beads as described above.

In each of the embodiments described herein, the infused foam laminate is constructed in a manner such that the density of fire retardant is consistent in the foam 22 regardless of the final size of the product. The starting density of the infused foam is approximately 140 kg/m$^3$. After compression, the infused foam density is in the range of 200-700 kg/m$^3$. After installation the laminate will cycle between densities of approximately 750 kg/m$^3$ at the smallest size of the expansion joint to approximately 400-450 kg/m$^3$ (or less) at the maximum size of the joint. This density of 400-450 kg/m$^3$ was determined through experimentation, as a reasonable minimum which still affords adequate fire retardant capacity, such that the resultant foam can pass the UL 2079 test program. The present invention is not limited to cycling in the foregoing ranges, however, and the foam may attain densities outside of the herein-described ranges.

In expansion joint systems employing any of the systems as described herein, installation is accomplished by adhering the foam laminate to the concrete substrate 50 using an adhesive such as epoxy. The epoxy or other adhesive is applied to the faces of the expansion joint prior to removing the foam/spline/foam assembly from the packaging thereof (such packaging may comprise restraining elements, straps, ties, bands, shrink wrap plastic, or the like). Once the packaging has been removed, the foam laminate will begin to expand, and it should be inserted into the joint in the desired orientation. Once the foam lamination has expanded to suit the expansion joint, it will become locked in by the combination of the foam back pressure and the adhesive. If a cover plate is installed, the cover plate can further facilitate the retention of the foam lamination in place in the joint.

In vertical expansion joint systems employing any of the systems as described herein, an adhesive may be pre-applied to the foam/spline/foam assembly. In this case, for installation, the assembled foam laminate and spline with the pre-applied adhesive is removed from the packaging and inserted into the space between the concrete surfaces to be joined where it is allowed to expand to meet the concrete substrate. Once this is done, the adhesive in combination with the back pressure of the foam will hold the foam in position. The cover plate can then be attached to the spline.

To fill an entire expansion joint, the installation as described above is repeated as needed. To join the end of one foam laminate to the end of another in either the horizontal configuration or the vertical configuration, a technique similar to that used with the sealant band and/or corner beads can be employed. After inserting one section of a system (joint) and adhering it securely to the concrete substrate, the next section is readied by placing it in proximity to the first section. A band or bead of the intumescent material and the elastomer material is applied on the end of the foam laminate in the appropriate locations. The next section is removed from the packaging and allowed to expand in close proximity to the previously installed section. When the expansion has taken place and the section is beginning to adhere to the substrates (joint faces), the section is firmly seated against the previously installed section. The outside faces are then tooled to create an aesthetically pleasing seamless interface.

The above mentioned installation procedure is simple, rapid, and has no invasive elements which impinge upon or penetrate the concrete (or other) substrates. This avoids many of the long term problems associated with invasive anchoring of screws into expansion joint faces.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of the appended claims.

What is claimed is:

1. A fire and water resistant expansion joint system, comprising:
   a cover plate;
   a spline attached to the cover plate along a first edge of the spline;
   a first foam having a fire-retardant material infused therein located on a first face of the spline;
   a second foam having a fire-retardant material infused therein located on a second face of the spline;
   wherein the spline depends from the cover plate and is positioned in a gap between substantially coplanar substrates such that the cover plate overlies the gap; and
   wherein the first foam is compressed between the first face of the spline and one of the coplanar substrates and the second foam is compressed between the second face of the spline and the other of the coplanar substrates, and the fire and water resistant expansion joint system is capable of withstanding exposure to a temperature of about 540° C. or greater for about five minutes.

2. The expansion joint system of claim 1, wherein a ratio of fire retardant material infused into the first foam and the second foam is in a range of about 3.5:1 to about 4:1.

3. The expansion joint system of claim 1, wherein the fire-retardant material infused into the foam comprises aluminum tri-hydrate.

4. The expansion joint system of claim 1, wherein the first foam and the second foam each comprise open celled foam comprising a plurality of laminations into which the fire-retardant material is infused.

5. The expansion joint system of claim 1, wherein each of the first foam and the second foam comprises a block of foam.

6. The expansion joint system of claim 1, wherein the spline is of monolithic construction.

7. The expansion joint system of claim 1, comprising an infused foam density, after compression, of about 200 kg/m$^3$ to about 700 kg/m$^3$.

8. The expansion joint system of claim 1, comprising a layer of elastomer on a surface of at least one of the first foam and the second foam.

9. The expansion joint system of claim 1, wherein the first foam and the second foam each comprises a plurality of laminations, at least one of the laminations is infused with the fire retardant material.

10. The expansion joint system of claim 9, wherein the infused lamination is an inner lamination.

11. The expansion joint system of claim 9, wherein the laminations are oriented, with respect to the direction in which the joint extends, in at least one of a parallel orientation, a perpendicular orientation, and a combination thereof.

12. The fire and water resistant expansion joint system of claim 1, wherein the fire and water resistant expansion joint system is capable of withstanding exposure to a temperature of about 930° C. for about one hour.

13. The fire and water resistant expansion joint system of claim 1, wherein the fire and water resistant expansion joint system is capable of withstanding exposure to a temperature of about 1010° C. for about two hours.

14. The fire and water resistant expansion joint system of claim 1, wherein the fire and water resistant expansion joint system is capable of withstanding exposure to a temperature of about 1260° C. for about eight hours.

15. The fire and water resistant expansion joint system of claim 14, wherein the ratio of the fire retardant material infused into the foam is in a range of about 3.5:1 to about 4:1 by weight.

16. The fire and water resistant expansion joint system of claim 1, wherein the spline comprises a non-conductive material.

17. The fire and water resistant expansion joint system of claim 16, wherein the spline includes a first member and a second member joined edge-to-edge with the first member, the first member being attached to the cover plate along an edge opposite the second member.

* * * * *